United States Patent
Lee et al.

(10) Patent No.: US 10,991,973 B2
(45) Date of Patent: Apr. 27, 2021

(54) LITHIUM ION SECONDARY BATTERY

(71) Applicant: LG CHEM, LTD., Seoul (KR)

(72) Inventors: Myung Ki Lee, Daejeon (KR); Jooyong Song, Daejeon (KR); Hee Seok Jeong, Daejeon (KR); Ji Hee Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 204 days.

(21) Appl. No.: 16/304,450

(22) PCT Filed: Dec. 21, 2017

(86) PCT No.: PCT/KR2017/015237
§ 371 (c)(1),
(2) Date: Nov. 26, 2018

(87) PCT Pub. No.: WO2018/139766
PCT Pub. Date: Aug. 2, 2018

(65) Prior Publication Data
US 2019/0157713 A1 May 23, 2019

(30) Foreign Application Priority Data
Jan. 26, 2017 (KR) .................. 10-2017-0012712

(51) Int. Cl.
*H01M 10/0525* (2010.01)
*H01M 10/0585* (2010.01)
(Continued)

(52) U.S. Cl.
CPC ....... *H01M 10/0525* (2013.01); *H01M 2/204* (2013.01); *H01M 4/366* (2013.01);
(Continued)

(58) Field of Classification Search
CPC .. H01M 10/0525; H01M 2/204; H01M 4/366; H01M 10/0585; H01M 2/26
See application file for complete search history.

(56) References Cited

U.S. PATENT DOCUMENTS

| | | | |
|---|---|---|---|
| 2011/0217591 A1* | 9/2011 | Heo ..................... | H01M 10/425 429/211 |
| 2016/0204410 A1* | 7/2016 | Heo ..................... | H01M 2/1061 429/158 |

(Continued)

FOREIGN PATENT DOCUMENTS

| | | |
|---|---|---|
| CN | 102195025 A | 9/2011 |
| CN | 105938880 A | 9/2016 |

(Continued)

OTHER PUBLICATIONS

Extended European Search Report for European Application No. 17894509.3, dated Jul. 29, 2019.
(Continued)

*Primary Examiner* — Helen Oi K Conley
(74) *Attorney, Agent, or Firm* — Birch, Stewart, Kolasch & Birch, LLP

(57) ABSTRACT

A lithium ion secondary battery including a plurality of electrode laminates, each electrode laminate including a positive electrode, a separator, and a negative electrode being alternatively laminated, each positive electrode and negative electrode having respective positive and negative electrode tabs protruding from a respective line segment, the positive electrode tabs of adjacent electrode laminates face each other and are connected to each other to provide a positive electrode tab bundle and the negative electrode tabs of the adjacent electrode laminates face each other and are connected to each other to provide a negative electrode tab bundle.

11 Claims, 7 Drawing Sheets

(51) Int. Cl.
  *H01M 4/36* (2006.01)
  *H01M 2/20* (2006.01)
  *H01M 4/02* (2006.01)
  *H01M 2/26* (2006.01)

(52) U.S. Cl.
  CPC .......... *H01M 10/0585* (2013.01); *H01M 2/26* (2013.01); *H01M 2004/027* (2013.01); *H01M 2004/028* (2013.01); *Y02E 60/10* (2013.01)

(56) References Cited

U.S. PATENT DOCUMENTS

2016/0351900 A1   12/2016   Sekiya et al.
2016/0380241 A1*  12/2016   Yun ..................... H01M 2/0275
                                                 429/144

FOREIGN PATENT DOCUMENTS

| | | |
|---|---|---|
| CN | 106299488 A | 1/2017 |
| KR | 10-2007-0099068 A | 10/2007 |
| KR | 10-2013-0073370 A | 7/2013 |
| KR | 10-2015-0059891 A | 6/2015 |
| KR | 10-1526513 B1 | 6/2015 |
| KR | 10-2015-0109018 A | 10/2015 |
| KR | 10-2016-0088002 A | 7/2016 |
| KR | 10-2016-0108115 A | 9/2016 |
| KR | 10-2016-0141676 A | 12/2016 |
| WO | WO 2016/140453 A1 | 9/2016 |

OTHER PUBLICATIONS

International Search Report for PCT/KR2017/015237 (PCT/ISA/210) dated Mar. 23, 2018.

* cited by examiner

LITHIUM ION SECONDARY BATTERY

CROSS-REFERENCE TO RELATED APPLICATION

The present application claims the benefit of the priority of Korean Patent Application No. 10-2017-0012712, filed on Jan. 26, 2017, which is hereby incorporated by reference in its entirety.

TECHNICAL FIELD

The present invention relates to a lithium ion secondary battery, and more particularly, to a lithium ion secondary battery having a structure that is capable of maximizing utilization of a space in the lithium ion secondary battery and easily changing a connection state between electrode assembles constituting the battery.

BACKGROUND ART

Secondary batteries capable of being repeatedly chargeable and dischargeable may be classified into a NaS secondary batteries, redox flow batteries, lithium ion secondary batteries, and the like according to types of materials involved in chemical reaction occurring in the charging and discharging. Particularly, such a lithium ion secondary battery is widely used among secondary batteries because the lithium ion secondary battery has high energy density and a few degree of self discharge.

In recent years, various fields requiring secondary batteries have been diversified, and demands for secondary batteries are also increasing. Particularly, demands for lithium ion secondary batteries are increasing in the fields of mobile, automotive and energy storage systems.

Secondary batteries may be classified into circular type secondary batteries, prismatic type secondary batteries, and pouch type secondary batteries according to a manufacturing method or structure. However, in the case of such a secondary battery according to the related art, when manufacture of cells constituting the secondary battery is completed, there is a problem that it is difficult to change a capacity, a voltage, and the like according to the demands of the consumer using the secondary battery.

Also, in the case of the secondary battery according to the related art, the secondary battery and the cells constituting the secondary battery are manufactured in only a regular shape such as a cylindrical shape, a rectangular plate shape, and the like to generate a so-called dead space which does not contribute to generation of an output, resulting in a problem that utilization of a space is deteriorated.

PRIOR ART DOCUMENTS

Patent Documents

[Patent Document 1] Korean Patent Publication No. 10-2016-0141676 (Dec. 9, 2016)

DISCLOSURE OF THE INVENTION

Technical Problem

Accordingly, an object of the present invention is to provide a secondary battery that is capable of being easily changed in capacity, voltage, and the like according to user's demands.

Also, another object of the present invention is to provide a secondary battery capable of minimizing a dead space that does not contribute to generation of an output to maximize utilization of a space.

Technical Solution

According to an aspect of the present invention for achieving the above object, the present invention provides a lithium ion secondary battery including: first and second electrode laminates, each of which has a structure in which a positive electrode, a separator, and a negative electrode, each of which comprises at least one line segment on a circumferential portion thereof, are alternately laminated; and a positive electrode tab and a negative electrode tab, which have shapes protruding from the line segments of the positive electrode and the negative electrode, respectively, wherein the positive electrode, the separator, and the negative electrode are laminated so that the line segments face each other, the positive electrode tabs are laminated to face each other and thereby to provide a positive electrode tab bundle, the negative electrode tabs are laminated to face each other and thereby to provide a negative electrode tab bundle, the second electrode laminate is connected to a side portion of the first electrode laminate, and the first electrode laminate is connected in series or parallel to the second electrode laminate.

Side planes of the first and second electrode laminates, which are formed by alternately laminating the positive electrode, the separator, and the negative electrode, each of which comprise the at least one line segment, may be disposed to face each other.

Each of the first and second electrode laminates may have a polygonal pillar shape because each of the positive electrode, the separator, and the negative electrode has a polygonal shape.

Each of the first and second electrode laminates may have a hexagonal pillar shape because each of the positive electrode, the separator, and the negative electrode has a hexagonal shape.

Each of the first and second electrode laminates may have a regular polygonal pillar shape because each of the positive electrode, the separator, and the negative electrode has a regular polygonal shape of which one internal angle has an aliquot part of 360 degrees.

Each of the first and second electrode laminates may have a regular hexagonal pillar shape because each of the positive electrode, the separator, and the negative electrode has a regular hexagonal shape.

The positive electrode tab bundle of the first electrode laminate may be electrically connected to the positive electrode tab bundle of the second electrode laminate, and the negative electrode tab bundle of the first electrode laminate may be electrically connected to the negative electrode tab bundle of the second electrode laminate.

The positive electrode tab bundle of the first electrode laminate may be electrically connected to the negative electrode tab bundle of the second electrode laminate, and the negative electrode tab bundle of the first electrode laminate may be electrically not connected to the positive electrode tab bundle of the second electrode laminate.

The lithium ion secondary battery may further include: a third electrode laminate having a structure in which the positive electrode, the separator, and the negative electrode, each of which comprises at least one line segment on a circumferential portion thereof, are alternately laminated; a positive electrode tab bundle and a negative electrode tab bundle, which respectively have shapes protruding from the second electrode laminate, on an opposite side of the first electrode laminate with respect to the second electrode laminate; and a positive electrode tab and a negative electrode tab, which respectively have shape protruding from the line segments of the positive electrode and the negative electrode of the third electrode laminate, wherein the positive electrode, the separator, the negative electrode of the third electrode laminate are laminated so that the line segments face each other, the positive electrode tabs of the third electrode laminate are laminated to face each other and thereby to provide a positive electrode tab bundle, the negative electrode tabs of the third electrode laminate are laminated to face each other and thereby to provide a negative electrode tab bundle, and the second electrode laminate and the third electrode laminate are connected in series or parallel to each other, like the connection between the first electrode laminate and the second electrode laminate.

The third electrode laminate may have a hexagonal pillar shape because each of the positive electrode, the separator, and the negative electrode of the third electrode laminate has a hexagonal shape.

The third electrode laminate may have a regular polygonal pillar shape because each of the positive electrode, the separator, and the negative electrode of the third electrode laminate has a regular polygonal shape of which one internal angle has an aliquot part of 360 degrees.

The third electrode laminate may have a regular hexagonal pillar shape because each of the positive electrode, the separator, and the negative electrode of the third electrode laminate has a regular hexagonal shape.

The positive electrode tab bundle of the first electrode laminate may be electrically connected to the positive electrode tab bundle of the second electrode laminate, the negative electrode tab bundle of the first electrode laminate may be electrically connected to the negative electrode tab bundle of the second electrode laminate, the positive electrode tab bundle of the second electrode laminate may be electrically connected to the positive electrode tab bundle of the third electrode laminate, and the negative electrode tab bundle of the second electrode laminate may be electrically connected to the negative electrode tab bundle of the third electrode laminate.

The positive electrode tab bundle of the first electrode laminate may be electrically connected to the negative electrode tab bundle of the second electrode laminate, the negative electrode tab bundle of the first electrode laminate may be electrically not connected to the positive electrode tab bundle of the second electrode laminate, the positive electrode tab bundle of the second electrode laminate may be electrically connected to the negative electrode tab bundle of the third electrode laminate, and the negative electrode tab bundle of the second electrode laminate may be electrically not connected to the positive electrode tab bundle of the third electrode laminate.

According to another aspect of the present invention for achieving the above object, the present invention provides a lithium ion secondary battery including: first, second, and third electrode laminates, each of which has a structure in which a positive electrode, a separator, and a negative electrode are alternately laminated, wherein each of the first and second electrode laminates has a regular polygonal pillar shape because each of the positive electrode, the separator, and the negative electrode has a regular polygonal shape of which one internal angle has an aliquot part of 360 degrees, a first side plane of the first side plane and a second side plane, which are disposed on side portions of the second electrode laminate and are adjacent to each other, faces and overlaps one side plane of the first electrode laminate, the second side plane of the first side plane and the second side plane, which are disposed on the side portions of the second electrode laminate and are adjacent to each other, faces and overlaps one side plane of the third electrode laminate, and the second electrode laminate is connected in series or parallel to the first and third electrode laminates.

The regular polygon may be a regular hexagon, and the regular polygonal pillar may be a regular hexagonal pillar.

One side plane of the first electrode laminate and one side plane of the third electrode laminate may face and overlap each other.

Advantageous Effects

According to the present invention, the secondary battery that is capable of being easily changed in capacity, voltage, and the like according to user's demands may be manufactured.

Also, according to the present invention, the dead space that does not contribute to generation of the output may be minimized in the secondary battery to maximize the utilization of the space.

MODE FOR CARRYING OUT THE INVENTION

Hereinafter, a structure of a lithium ion secondary battery according to an embodiment of the present invention will be described with reference to the accompanying drawings.

Figure 1:
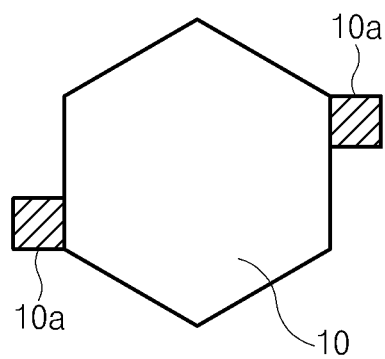
FIG. 1 is a plan view illustrating a structure of a positive electrode of a lithium ion secondary battery according to an embodiment of the present invention.
Figure 2:
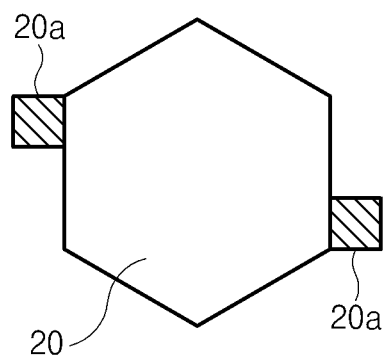
FIG. 2 is a plan view illustrating a structure of a negative electrode of the lithium ion secondary battery according to an embodiment of the present invention.

FIG. 1 is a plan view illustrating a structure of a positive electrode of a lithium ion secondary battery according to an embodiment of the present invention, and FIG. 2 is a plan view illustrating a structure of a negative electrode of the lithium ion secondary battery according to an embodiment of the present invention.

Referring to FIG. 1, a circumferential portion of a positive electrode 10 of the lithium ion secondary battery according to an embodiment of the present invention may include at least one line segment. FIG. 1 illustrates a case in which the circumferential portion of the positive electrode 10 includes six line segments. Also, the positive electrode 10 of the lithium ion secondary battery according to an embodiment of the present invention may have a polygonal shape. FIG. 1 illustrates a case in which the positive electrode 10 has a hexagonal shape. Also, the positive electrode 10 of the lithium ion secondary battery according to an embodiment of the present invention may have a regular polygonal shape (for example, a square shape, an equilateral triangular shape, a regular hexagonal shape, and the like) of which one internal angle has an aliquot part of 360 degrees. FIG. 1 illustrates a case in which the positive electrode 10 has a regular hexagonal shape.

Referring to FIG. 1, a positive electrode tab 10a having a shape that protrudes from the positive electrode 10 may be provided. The positive electrode tab 10a may have a shape protruding from the line segment. Here, the positive electrode tab 10a may be provided in plurality. Here, at least some of the positive electrode tabs 10a may be disposed in directions opposite to each other. FIG. 1 illustrates a case in which two positive electrode tabs 10a are disposed on the positive electrode 10 having the regular hexagonal shape in the directions opposite to each other. However, three or more positive electrode tabs 10a may be disposed on the positive electrode 10.

The above description with respect to the positive electrode of the lithium ion secondary battery according to an embodiment of the present invention may be equally applied to a case of a negative electrode.

That is, referring to FIG. 2, a circumferential portion of a negative electrode 20 of the lithium ion secondary battery according to an embodiment of the present invention may include at least one line segment. FIG. 2 illustrates a case in which the circumferential portion of the negative electrode 20 includes six line segments. Also, the negative electrode 20 of the lithium ion secondary battery according to an embodiment of the present invention may have a polygonal shape. FIG. 2 illustrates a case in which the negative electrode 20 has a hexagonal shape. Also, the negative electrode 20 of the lithium ion secondary battery according to an embodiment of the present invention may have a regular polygonal shape (for example, a square shape, an equilateral triangular shape, a regular hexagonal shape, and the like) of which one internal angle has an aliquot part of 360 degrees. FIG. 2 illustrates a case in which the negative electrode 20 has a regular hexagonal shape.

Referring to FIG. 2, a negative electrode tab 20a having a shape that protrudes from the negative electrode 20 may be provided. The negative electrode tab 20a may have a shape protruding from the line segment. Here, the negative electrode tab 20a may be provided in plurality. Here, at least some of the negative electrode tabs 20a may be disposed in directions opposite to each other. FIG. 2 illustrates a case in which two negative electrode tabs 20a are disposed on the negative electrode 20 having the regular hexagonal shape in the directions opposite to each other. However, three or more negative electrode tabs 20a may be disposed on the negative electrode 20.

Figure 3:
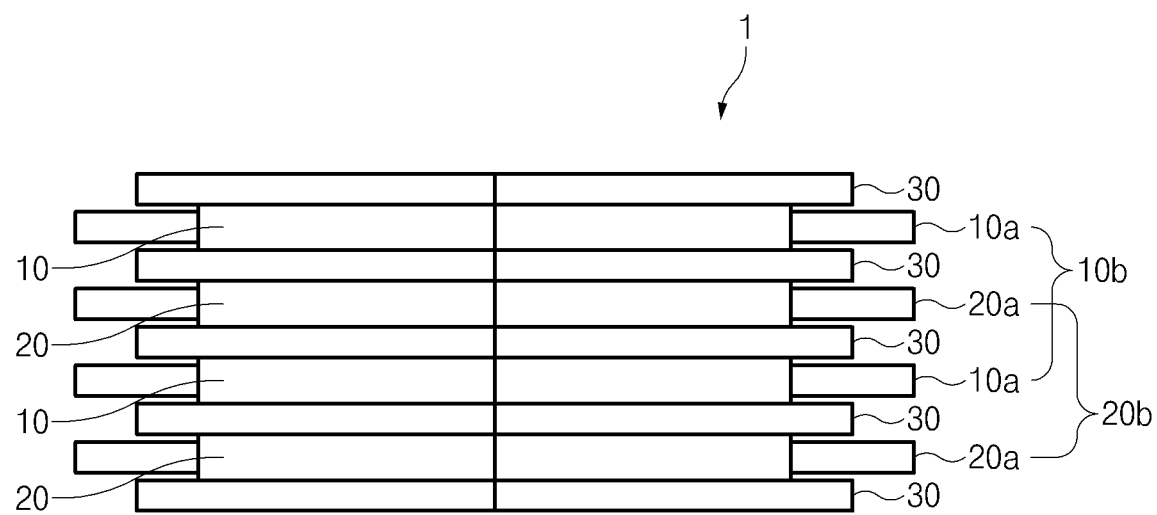
FIG. 3 is a side view illustrating a laminated structure of an electrode laminate of the lithium ion secondary battery according to an embodiment of the present invention.
Figure 4:
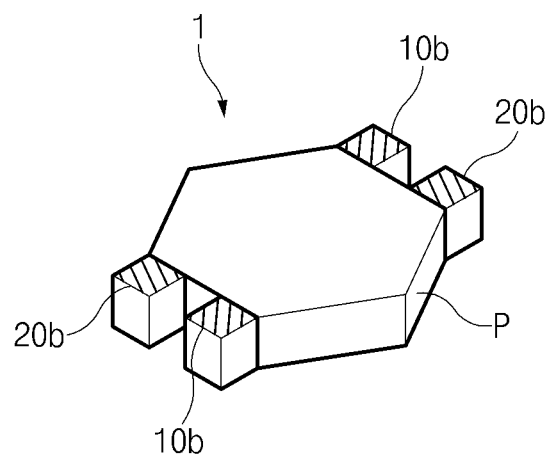
FIG. 4 is a perspective view illustrating a structure of the electrode laminate of the lithium ion secondary battery according to an embodiment of the present invention.

FIG. 3 is a side view illustrating a laminated structure of an electrode laminate of the lithium ion secondary battery according to an embodiment of the present invention, and FIG. 4 is a perspective view illustrating a structure of the electrode laminate of the lithium ion secondary battery according to an embodiment of the present invention.

Referring to FIGS. 3 and 4, an electrode laminate 1 may have a structure in which a positive electrode 10, a separator 30, and a negative electrode 20 are alternately laminated. Here, the positive electrode 10, the negative electrode 20, and the separator 30 may have shapes corresponding to each other. The fact that the positive electrode 10, the negative electrode 20, and the separator 30 have the shapes corresponding to each other may mean that the positive electrode 10, the negative electrode 20, and the separator 30 are the same or similar to each other. Thus, the fact that the positive electrode 10, the negative electrode 20, and the separator 30 have the shapes corresponding to each other may not mean that the positive electrode 10, the negative electrode 20, and the separator 30 have the same shape and the same size.

As described above, the positive electrode tab 10a and the negative electrode tab 20a may protrude from the positive electrode 10 and the negative electrode 20, respectively. Here, as illustrated in FIGS. 3 and 4, the electrode laminate 1 may have a structure in which the positive electrode 10 and the negative electrode 20 are laminated so that the positive electrode tabs 10a face each other, and the negative electrode tabs 20a face each other. Also, as described above, the positive electrode tab 10a and the negative electrode tab 20a may have shapes protruding from at least one or more line segments constituting the circumferential portions of the positive electrode 10 and the negative electrode 20, respectively. Also, since the separator 30 has a shape in which the positive electrode 10 and the negative electrode 20 correspond to each other, the positive electrode 10, the separator 30, and the negative electrode 20 may be laminated so that at least one or more line segments face each other. Thus, the electrode laminate of the lithium ion secondary battery according to an embodiment of the present invention may have a pillar shape having the same horizontal cross-section (including a macroscopically pillar shape in which a difference in size between the electrode and the separator is not large). For example, the electrode laminate may have a polygonal pillar shape. FIG. 4 illustrates a case in which the electrode laminate 1 has a regular hexagonal pillar shape.

Since the electrode laminate 1 has the structure in which the positive electrode 10 and the negative electrode 20 are laminated so that the positive electrode tabs 10a face each other and the negative electrode tabs 20a face each other, the electrode laminate 1 may include a positive electrode tab bundle 10b in which a plurality of positive electrode tabs 10a are assembled with each other and a negative electrode tab bundle 20b in which a plurality of negative electrode tabs 20a are assembled with each other.

Similar to the cases of the positive electrode tabs and the negative electrode tabs, each of the positive electrode bundle 10b and the negative electrode tab bundle 20b of the electrode laminate 1 may also be provided in plurality. At least some of the positive electrode tab bundle 10b may be disposed in directions opposite to each other, and at least some of the negative electrode tab bundle 20b may also be disposed in directions opposite to each other. Three or more positive electrode tab bundle 10b and three or more negative electrode tab bundle 20b may also be provided.

Also, as illustrated in FIGS. 3 and 4, the electrode laminate 1 may include a side plane P formed by alternately laminating the positive electrode 10, the separator 30, and the negative electrode 20. FIG. 4 illustrates a case in which six side planes P are disposed on the electrode laminate 1 having the regular hexagonal pillar shape. Here, one or more positive electrode tab bundle 10b and one or more negative electrode tab bundle 20b may be disposed on at least one side plane P. FIG. 4 illustrates a case in which the positive electrode tab bundle 10b and the negative electrode tab bundle 20b are disposed on each of two side planes, which are disposed in directions opposite to each other, of the side planes of the electrode laminate 1.

The lithium ion secondary battery according to an embodiment of the present invention may be manufactured by connecting the plurality of electrode laminates to each other. According to an embodiment of the present invention, the lithium ion secondary battery may be variously modified by changing the manner, in which the electrode laminates are electrically connected to each other, according to user's demands.

The electrode assembly may be classified into a series connection type and a parallel connection type according to whether the electrodes having the same polarity are connected to each other, or the electrodes having different polarities are connected to each other. That is, the connection of the electrodes having the same polarity to each other between the electrode assemblies is referred to as parallel connection, and the connection of the electrodes having different polarities to each other between the electrode assemblies is referred to as serial connection. According to the present invention, the lithium ion secondary battery may be variously modified according to whether the plurality of electrode assembles are connected to each other in the series connection manner or the parallel connection manner.

In regard of the meaning of the expression to be used below, 'electrically connected between two constituents' may mean a state in which current is capable of flowing between the two constituents. Thus, 'electrically connected' may not mean only that the two constituents come into physical contact with each other.

Figure 5:
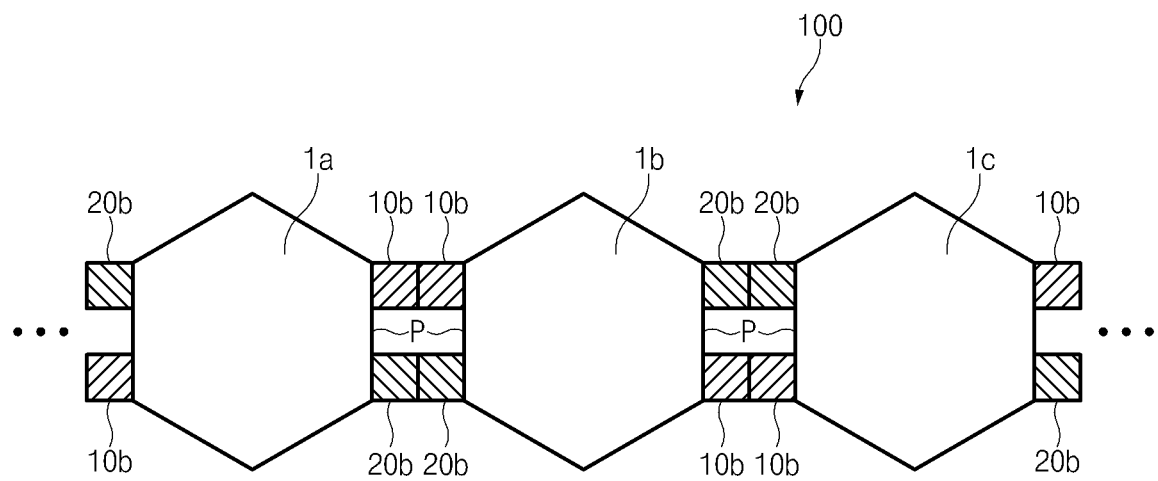
FIG. 5 is a plan view illustrating a parallel connection structure between the electrode laminates of the lithium ion secondary battery according to an embodiment of the present invention.

FIG. 5 is a plan view illustrating a parallel connection structure between the electrode laminates of the lithium ion secondary battery according to an embodiment of the present invention.

As illustrated in FIG. 5, electrode laminates 1*a*, 1*b*, and 1*c* of the lithium ion secondary battery according to an embodiment of the present invention may be electrically connected to each other on the side portion of each of the electrode laminates. For this, the electrode laminates 1*a*, 1*b*, and 1*c* may be disposed so that the side planes P on which the positive electrode tab bundle 10*b* and the negative electrode tab bundle 20*b* are disposed are provided to face each other.

As illustrated in FIG. 5, the electrode laminates 1*a*, 1*b*, and 1*c* of the lithium ion secondary battery according to an embodiment of the present invention may be electrically connected in parallel to each other. For this, the positive electrode tab bundle 10*b* of the electrode laminate may be electrically connected to the positive electrode tab bundle 10*b* of the other electrode laminate, and the negative electrode tab bundle 20*b* of the electrode laminate may be electrically connected to the negative electrode tab bundle 20*b* of the other electrode laminate to form a parallel connection body 100.

This parallel connection may occur not only between two electrode laminates, but also between three or more electrode laminates. For example, in the three electrode laminates illustrated in FIG. 5, when the leftmost electrode laminate is referred to as a first electrode laminate 1*a*, the intermediate electrode laminate is referred to as a second electrode laminate 1*b*, and the rightmost electrode laminate is referred to as a third electrode laminate 1*c*, the positive electrode tab bundle 10*b* and the negative electrode tab bundle 20*b*, which are disposed at the left side of the second electrode laminate 1*b*, may be electrically connected to the positive electrode tab bundle 10*b* and the negative electrode tab bundle 20*b*, which are disposed at the right side of the first electrode laminate 1*a*, respectively. Thus, the positive electrode tab bundle 10*b* and the negative electrode tab bundle 20*b*, which are disposed at the right side of the second electrode laminate 1*b*, may be electrically connected to the positive electrode tab bundle 10*b* and the negative electrode tab bundle 20*b*, which are disposed at the left side of the third electrode laminate 1*c*, respectively.

Figure 6:
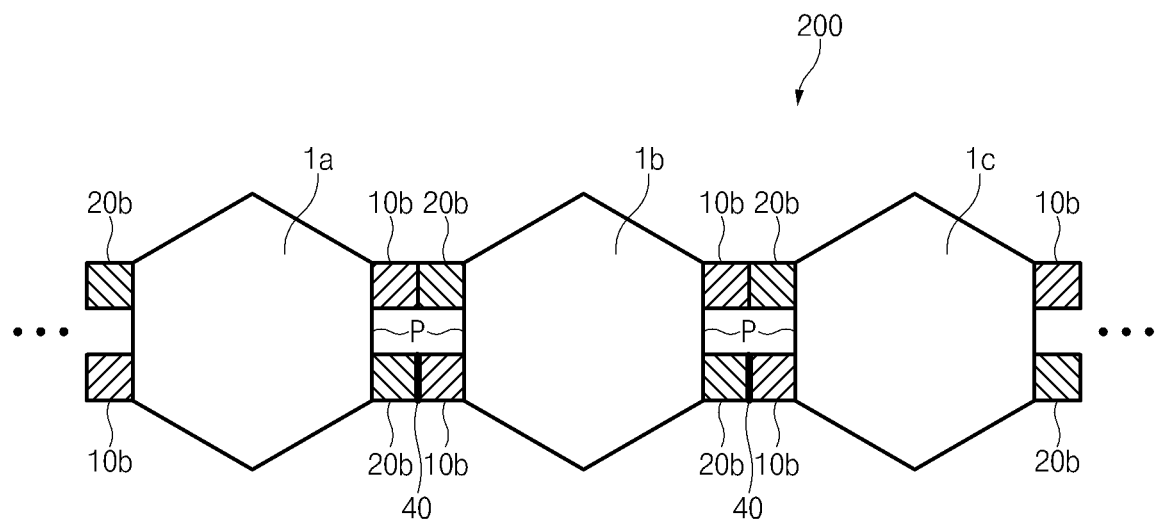
FIG. 6 is a plan view illustrating a series connection structure between the electrode laminates of the lithium ion secondary battery according to an embodiment of the present invention.

FIG. 6 is a plan view illustrating a series connection structure between the electrode laminates of the lithium ion secondary battery according to an embodiment of the present invention.

Similar to the case of FIG. 5, electrode laminates 1*a*, 1*b*, and 1*c* of the lithium ion secondary battery according to an embodiment of the present invention may also be electrically connected to each other on the side portion of each of the electrode laminates. For this, the electrode laminates 1*a*, 1*b*, and 1*c* may be disposed so that the side planes P on which the positive electrode tab bundle 10*b* and the negative electrode tab bundle 20*b* are disposed are provided to face each other.

As illustrated in FIG. 6, the electrode laminates 1*a*, 1*b*, and 1*c* of the lithium ion secondary battery according to an embodiment of the present invention may be electrically connected in series to each other. For this, the positive electrode tab bundle 10*b* of the electrode laminate may be electrically connected to the negative electrode tab bundle 10*b* of the other electrode laminate to form a series connection body 200.

Also, similar to the parallel connection, the series connection may occur not only between two electrode laminates, but also between three or more electrode laminates. For example, in the three electrode laminates illustrated in FIG. 6, when the leftmost electrode laminate is referred to as a first electrode laminate 1*a*, the intermediate electrode laminate is referred to as a second electrode laminate 1*b*, and the rightmost electrode laminate is referred to as a third electrode laminate 1*c*, the negative electrode tab bundle 20*b* disposed at the left side of the second electrode laminate 1*b* may be electrically connected to the positive electrode tab bundle 10*b* disposed at the right side of the first electrode laminate 1*a*, and the positive electrode tab bundle 10*b* disposed at the right side of the second electrode laminate 1*b* may be electrically connected to the negative electrode tab bundle 20*b* disposed at the left side of the third electrode laminate 1*c*.

However, unlike the parallel connection, the series connection may result in short circuit when both the positive electrode tab bundle and the negative electrode tab bundle are electrically connected between the electrode laminates. That is, referring to FIG. 6, when the positive electrode tab bundle 10*b* and the negative electrode tab bundle 20*b*, which are disposed at the right side of the first electrode laminate 1*a*, are electrically connected to the negative electrode tab bundle 20*b* and the positive electrode tab bundle 20*b*, which are disposed at the left side of the second electrode laminate 1*b*, respectively, the short circuit may occur. Thus, in the case of the series connection, only one electrode tab bundle may be electrically connected to each other between the electrode laminates. FIG. 6 illustrates a case in which the positive electrode tab bundle 10*b* disposed at the right side of the first electrode laminate 1*a* is electrically connected to the negative electrode tab bundle 20*b* disposed at the left side of the second electrode laminate 1*b*, and the negative electrode tab bundle 20*b* disposed at the right side of the first electrode laminate 1*a* is not electrically connected to the positive electrode tab bundle 10*b* disposed at the left side of the second electrode laminate 1*b*. Here, an insulator 40 for preventing the electrical connection from occurring may be disposed between the negative electrode tab bundle 20b disposed at the right side of the first electrode laminate 1a and the positive electrode tab bundle 10b disposed at the left side of the second electrode laminate 2b. Also, FIG. 6 illustrates a case in which the positive electrode tab bundle 10b disposed at the right side of the second electrode laminate 2b is electrically connected to the negative electrode tab bundle 20b disposed at the left side of the third electrode laminate 1c, and the negative electrode tab bundle 20b disposed at the right side of the second electrode laminate 2b is not electrically connected to the positive electrode tab bundle 10b disposed at the left side of the third electrode laminate 1c. Here, an insulator 40 for preventing the electrical connection from occurring may be disposed between the negative electrode tab bundle 20b disposed at the right side of the second electrode laminate 1b and the positive electrode tab bundle 10b disposed at the left side of the third electrode laminate 1c.

Figure 7:
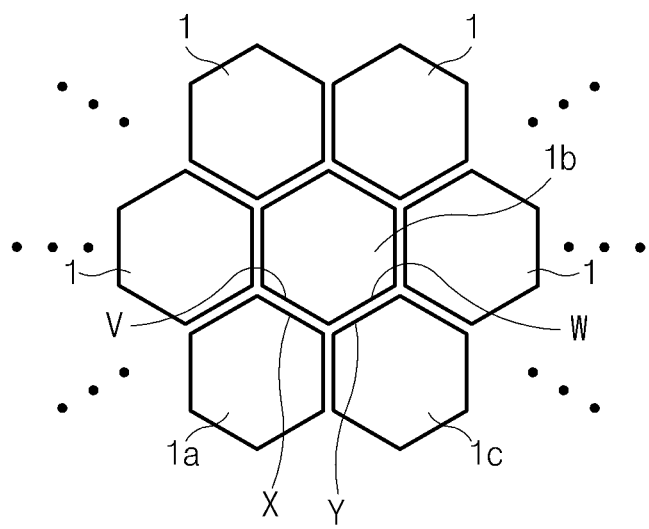
FIG. 7 is a plan view illustrating a connection structure between electrode laminates of a lithium ion secondary battery according to another embodiment of the present invention.

FIG. 7 is a plan view illustrating a connection structure between electrode laminates of a lithium ion secondary battery according to another embodiment of the present invention.

As described above, since each of a positive electrode, a separator, and a negative electrode constituting an electrode laminate has a regular polygonal shape of which one internal angle has an aliquot part of 360 degrees, a plurality of electrode laminates 1 according to another embodiment of the present invention may have a regular polygonal pillar shape of which one internal angle has an aliquot part of 360 degrees. Here, the electrode laminates 1 may be disposed on each of the side planes of the electrode laminate 1 to face the side planes of the other electrode laminates 1. FIG. 7 illustrates a case in which the electrode laminates 1 are disposed on each of the side planes of the plurality of electrode laminates 1, each of which has the regular hexagonal pillar shape, to face the side planes of the other electrode laminates 1.

According to another embodiment of the present invention, the plurality of electrode laminates may be disposed to face the side planes side by side, thereby maximizing efficiency in arrangement of the electrode laminates.

For this, referring to FIG. 7, one V of the two side planes adjacent to each other as the side plane formed on a side portion of the second electrode laminate 1b may face and overlap one side plane X of the first electrode laminate 1a, and the other one W of the two side planes adjacent to each other as the side plane formed on a side portion of the second electrode laminate 1b may face and overlap one side plane Y of the third electrode laminate 1c (the face and overlap may mean that the side planes face each other with sizes corresponding to each other). Also, one side plane of the first electrode laminate 1a and one side plane of the third electrode laminate 1c may face and overlap each other.

Particularly, the arrangement structure of the electrode laminates of FIG. 7 may be understood as a structure similar to a honeycomb structure in which line segments of a plurality of hexagons are respectively disposed to face line segments of the other hexagon.

A large number of electrode laminates including the first electrode laminate 1a, the second electrode laminate 1b, and the third electrode laminate 1c may be disposed adjacent to each other to form the honeycomb structure.

According to the present invention, as described above, when the side planes of the electrode laminates, each of which has a polygonal pillar structure, are disposed to face and overlap each other, a dead space that does not contribute to generation of an output may be minimized in the secondary battery to maximize utilization of a space of the secondary battery.

Also, the electrode assemblies may be connected in series or parallel to each other. The method for the series connection and the parallel connection may be the same as described above.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A lithium ion secondary battery comprising:
   first and second electrode laminates, wherein each of the first and second electrode laminates has a structure including a positive electrode, a separator, and a negative electrode, each positive electrode, separator, and negative electrode including a plurality of line segments on a circumferential portion thereof, the positive electrode, the separator, and the negative electrode of each of the first and second electrode laminates are alternatively laminated,
   wherein each of the first and second electrode laminates includes positive electrode tabs protruding from the respective positive electrode and negative electrode tabs protruding from the respective negative electrode, each positive electrode tab and negative electrode tab has a shape protruding from the respective line segment,
   wherein the positive electrode, the separator, and the negative electrode of the first and second electrode laminates are laminated so that the respective line segments face each other,
   wherein the positive electrode tabs of the first and second electrode laminates are laminated to face each other to provide a positive electrode tab bundle,
   wherein the negative electrode tabs of the first and second electrode laminates are laminated to face each other to provide a negative electrode tab bundle,
   wherein the second electrode laminate is connected to a side portion of the first electrode laminate,
   wherein the first electrode laminate is connected in series or parallel to the second electrode laminate,
   wherein each of the first and second electrode laminates has an equilateral triangular pillar shape or a regular hexagonal pillar shape,
   wherein the lithium ion secondary battery further comprises an insulator located between the negative electrode tabs of the first electrode laminate and the positive electrode tabs of the second electrode laminate such that the negative electrode tabs of the first electrode laminate are not electrically connected to the positive electrode tabs of the second electrode laminate, and
   wherein one of the positive electrode tabs of the first electrode laminate is electrically connected to one of the negative electrode tabs of the second electrode laminate.

2. The lithium ion secondary battery of claim 1, wherein side planes of the first and second electrode laminates are disposed to face each other.

3. The lithium ion secondary battery of claim 1, wherein each respective positive electrode, separator, and negative electrode has a regular hexagonal shape.

4. The lithium ion secondary battery of claim 1, further comprising:
a third electrode laminate having a structure including a positive electrode, a separator, and a negative electrode, wherein each of the positive electrode, the separator and the negative electrode of the third electrode laminate comprises line segments on circumferential portions thereof, and wherein the positive electrode, the separator, and the negative electrode of the third electrode laminate are alternately laminated,
wherein the third electrode laminate includes a positive electrode tab and a negative electrode tab, the positive electrode tab and the negative electrode tab of the third electrode laminate having a shape protruding from the respective line segments of the positive electrode and the negative electrode of the third electrode laminate,
wherein the positive electrode, the separator, the negative electrode of the third electrode laminate are laminated so that the respective line segments face each other,
wherein the positive electrode tabs of the third electrode laminate are laminated to face the positive electrode tabs of the second electrode laminate to provide a positive electrode tab bundle,
wherein the negative electrode tabs of the third electrode laminate are laminated to face the negative electrode tabs of the second electrode laminate to provide a negative electrode tab bundle, and
wherein the second electrode laminate and the third electrode laminate are connected in series or parallel to each other.

5. The lithium ion secondary battery of claim 4, wherein the third electrode laminate has a hexagonal pillar shape, and
wherein each of the positive electrode, the separator, and the negative electrode of the third electrode laminate has a hexagonal shape.

6. The lithium ion secondary battery of claim 4, wherein the third electrode laminate has a regular polygonal pillar shape, and
wherein each of the positive electrode, the separator, and the negative electrode of the third electrode laminate has a regular polygonal shape with one internal angle having an aliquot part of 360 degrees.

7. The lithium ion secondary battery of claim 4, wherein the third electrode laminate has a regular hexagonal pillar shape, and
wherein each of the positive electrode, the separator, and the negative electrode of the third electrode laminate has a regular hexagonal shape.

8. The lithium ion secondary battery of claim 4,
wherein one of the positive electrode tabs of the second electrode laminate is electrically connected to one of the positive electrode tabs of the third electrode laminate, and
wherein one of the negative electrode tabs of the second electrode laminate is electrically connected to one of the negative electrode tabs of the third electrode laminate.

9. The lithium ion secondary battery of claim 4,
wherein one of the positive electrode tabs of the second electrode laminate is electrically connected to one of the negative electrode tabs of the third electrode laminate, and
wherein the negative electrode tabs of the second electrode laminate are not electrically connected to the positive electrode tabs of the third electrode laminate.

10. A lithium ion secondary battery comprising:
first, second, and third electrode laminates, each of the first, second and third electrode laminates has a structure including a positive electrode, a separator, and a negative electrode, wherein the positive electrode, separator, and negative electrode of each of the first, second, and third electrode laminates are alternately laminated,
wherein each of the first and second electrode laminates has a regular hexagonal pillar shape or an equilateral triangular pillar shape,
wherein the second electrode laminate includes a first side plane and a second side plane, disposed on side portions of the second electrode laminate and are adjacent to each other,
wherein the first side plane of the second electrode laminate faces and overlaps one side plane of the first electrode laminate,
wherein the second side plane of the second electrode laminate faces and overlaps one side plane of the third electrode laminate,
wherein the second electrode laminate is connected in series or parallel to the first and third electrode laminates,
wherein the lithium ion secondary battery further comprises an insulator located between the negative electrode tabs of the first electrode laminate and the positive electrode tabs of the second electrode laminate such that the negative electrode tabs of the first electrode laminate are not electrically connected to the positive electrode tabs of the second electrode laminate, and
wherein one of the positive electrode tabs of the first electrode laminate is electrically connected to one of the negative electrode tabs of the second electrode laminate.

11. The lithium ion secondary battery of claim 10, wherein another side plane of the first electrode laminate and another side plane of the third electrode laminate face and overlap each other.

* * * * *